US011613218B2

(12) United States Patent
Tseng et al.

(10) Patent No.: US 11,613,218 B2
(45) Date of Patent: Mar. 28, 2023

(54) SEAT ADJUSTMENT

(71) Applicant: Ford Global Technologies, LLC, Dearborn, MI (US)

(72) Inventors: Fling Finn Tseng, Ann Arbor, MI (US); Shiqi Qiu, Canton, MI (US); Johannes Geir Kristinsson, Ann Arbor, MI (US); Patrick Maloney, Livonia, MI (US); Alex Perkins, Detroit, MI (US); Himanshu Verma, Farmington Hills, MI (US); Nikhil Kailas Jamdade, Dearborn, MI (US); Vishal Vinayak Nageshkar, Farmington Hills, MI (US); Victoria Leigh Schein, Dearborn, MI (US); Samuel Laidlaw, Plymouth, MI (US); Bhagyashri Satyabodha Katti, Novi, MI (US); Kalyani Purushottam Sonawane, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 17/120,676

(22) Filed: Dec. 14, 2020

(65) Prior Publication Data

US 2022/0185210 A1 Jun. 16, 2022

(51) Int. Cl.
*B60R 16/037* (2006.01)
*B60N 2/66* (2006.01)
*B60N 2/02* (2006.01)

(52) U.S. Cl.
CPC .......... *B60R 16/037* (2013.01); *B60N 2/0244* (2013.01); *B60N 2/66* (2013.01); *B60N 2002/026* (2013.01); *B60N 2002/0268* (2013.01)

(58) Field of Classification Search
CPC ........... B60R 16/037; B60R 21/01516; B60N 2/0244; B60N 2/66; B60N 2002/026; B60N 2002/0268
See application file for complete search history.

(56) References Cited

U.S. PATENT DOCUMENTS

2010/0036567 A1\* 2/2010 Gandhi ................. B60N 2/002
701/49
2017/0349061 A1\* 12/2017 Benson ................ B60N 2/1615
(Continued)

FOREIGN PATENT DOCUMENTS

EP 1092134 B1 1/2003
EP 3215402 B1 12/2019

*Primary Examiner* — Tyler J Lee
*Assistant Examiner* — Yufeng Zhang
(74) *Attorney, Agent, or Firm* — Vichit Chea; Bejin Bieneman PLC

(57) ABSTRACT

A computer includes a processor and a memory storing instructions executable by the processor to receive a series of pressure maps indicating a respective series of sitting positions of an occupant in a seat, wherein the pressure maps include a current pressure map; update a profile of the occupant based on the pressure maps, wherein the profile includes a plurality of clusters of sitting positions and classifications of the clusters as preferred or nonpreferred, and updating the profile includes sorting one of the sitting positions into one of the clusters that is classified as preferred in response to the occupant remaining in that sitting position for greater than a threshold time; and adjust a physical configuration of the seat in response to the current sitting position being in one of the clusters that is classified as nonpreferred.

20 Claims, 7 Drawing Sheets

(56) References Cited

U.S. PATENT DOCUMENTS

2020/0079385 A1 3/2020 Beaurepaire et al.
2020/0180534 A1 6/2020 Kohler et al.

* cited by examiner

SEAT ADJUSTMENT

BACKGROUND

Vehicles typically include a passenger cabin to house occupants of the vehicle. The passenger cabin typically includes one or more front seats disposed at a front of the passenger cabin, one or more back seats disposed behind the front seats, and possibly third-row seats at a rear of the passenger cabin.

Each seat typically includes a seat back, a seat bottom, and a head restraint. The head restraint is supported by the seat back and may be stationary or movable relative to the seat back. The seat back is supported by the seat bottom and may be stationary or movable relative to the seat bottom. The seat back, the seat bottom, and/or the head restraint are often adjustable in multiple degrees of freedom.

DETAILED DESCRIPTION

Figure 1:
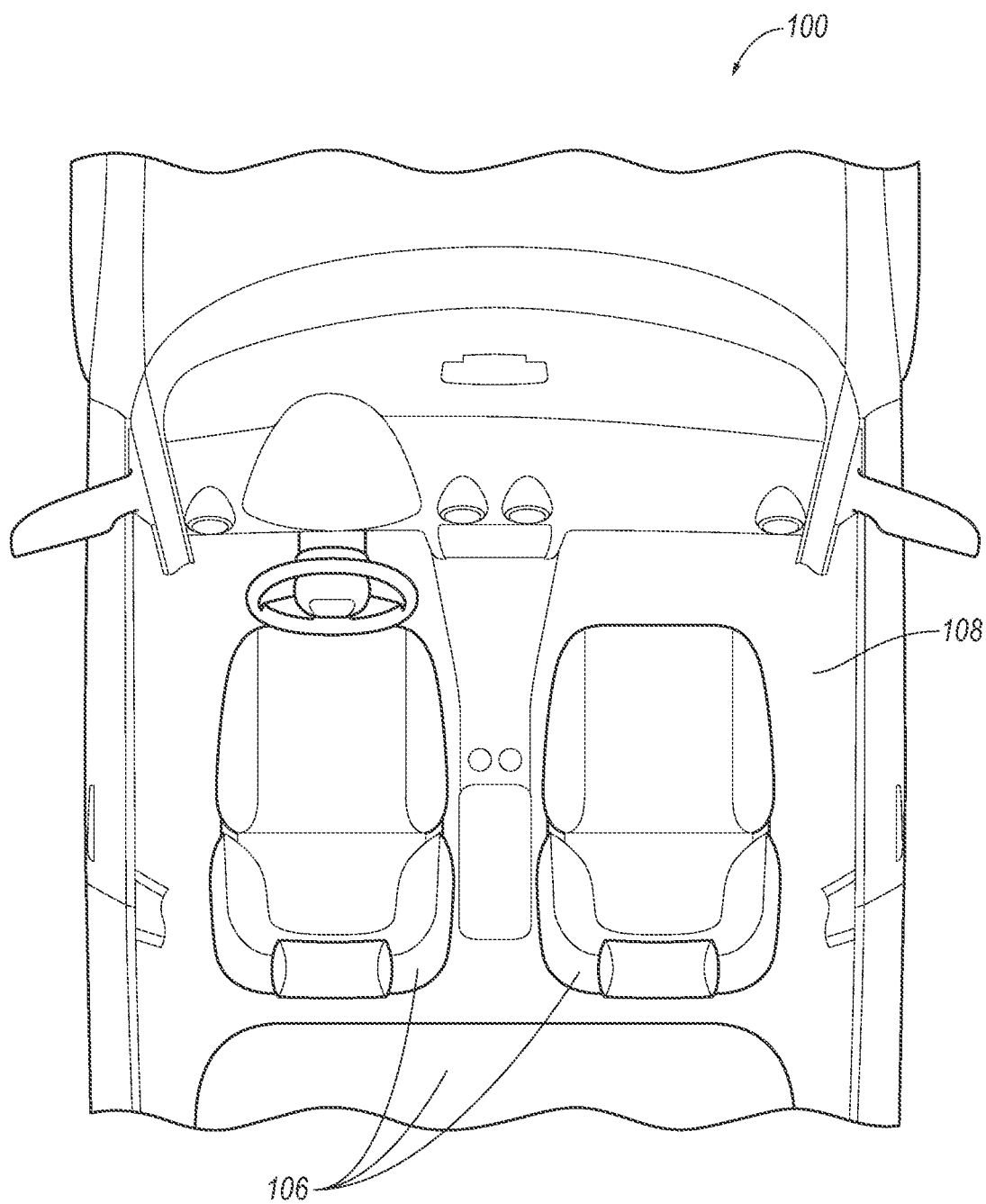
FIG. 1 is a top view of an example vehicle with a passenger cabin exposed for illustration.

A computer includes a processor and a memory storing instructions executable by the processor to receive a series of pressure maps indicating a respective series of sitting positions of an occupant in a seat, wherein the pressure maps include a current pressure map; update a profile of the occupant based on the pressure maps, wherein the profile includes a plurality of clusters of sitting positions and classifications of the clusters as preferred or nonpreferred, and updating the profile includes sorting one of the sitting positions into one of the clusters that is classified as preferred in response to the occupant remaining in that sitting position for greater than a threshold time; and adjust a physical configuration of the seat in response to the current sitting position being in one of the clusters that is classified as nonpreferred.

Adjusting the physical configuration of the seat may be based on the one of the clusters into which the cluster including the current sitting position is most likely to transition. The profile may include a matrix of probabilities of transition from respective clusters into respective other clusters, and the matrix is based on the series of pressure maps.

The instructions may include instructions to sort each of the series of sitting positions into one of the clusters based on similarity measures between that sitting position and each of the clusters. The instructions may include instructions to, in response to none of the similarity measures between one of the sitting positions and each of the clusters being above a threshold similarity, create a new cluster and sort that sitting position into the new cluster.

The clusters may be based on the sitting positions of a plurality of other occupants. The instructions may include instructions to determine a plurality of features of the occupant, and the clusters may be based only on the sitting positions of the occupant and other occupants having the same features as the occupant. The features may include a vehicle type in which the respective occupants were sitting in the sitting positions.

The features may include demographic information about the occupants.

The clusters may be based at least in part on the sitting positions of the other occupants until a collection distance or collection time of the series of pressure maps of the occupant increases above a respective distance threshold or time threshold, after which the clusters may be based wholly on the series of sitting positions of the occupant.

The instructions may include instructions to classify each cluster as preferred or nonpreferred based on a duration of remaining in the sitting positions in that cluster, and greater duration may increase a likelihood of the classification being preferred.

The instructions may include instructions to classify each cluster as preferred or nonpreferred based on a variation among the sitting positions of that cluster, and higher variation may increase a likelihood of the classification being nonpreferred.

The instructions may include instructions to classify each cluster as preferred or nonpreferred based on a return time from switching out of any of the sitting positions in that cluster to switching back to one of the sitting positions in that cluster, and a greater return time may increase a likelihood of the classification being nonpreferred.

The instructions may include instructions to combine two clusters into a single cluster based on overlap between the two clusters. Combining two clusters may only occur if the two clusters are both classified as preferred or both classified as nonpreferred.

The instructions may include instructions to identify the occupant, and load the profile of the occupant based on the identification of the occupant.

A system includes a seat having a physical configuration that is adjustable and a computer communicatively coupled to the seat. The computer is programmed to receive a series of pressure maps indicating a respective series of sitting positions of an occupant in the seat, wherein the pressure maps include a current pressure map; update a profile of the occupant based on the pressure maps, wherein the profile includes a plurality of clusters of sitting positions and classifications of the clusters as preferred or nonpreferred, and updating the profile includes sorting one of the sitting positions into one of the clusters that is classified as preferred in response to the occupant remaining in that sitting position for greater than a threshold time; and adjust the physical configuration of the seat in response to the current sitting position being in one of the clusters that is classified as nonpreferred.

The physical configuration may include at least one of a tilt of the seat, a height of the seat, a recline angle of the seat, or a lumbar support position of the seat.

The seat may include a seat bottom including a plurality of bladders, and the physical configuration may include fill levels of the respective bladders.

A method includes receiving a series of pressure maps indicating a respective series of sitting positions of an occupant in a seat, wherein the pressure maps include a current pressure map; updating a profile of the occupant based on the pressure maps, wherein the profile includes a plurality of clusters of sitting positions and classifications of the clusters as preferred or nonpreferred, and updating the profile includes sorting one of the sitting positions into one of the clusters that is classified as preferred in response to the occupant remaining in that sitting position for greater than a threshold time; and adjusting a physical configuration of the seat in response to the current sitting position being in one of the clusters that is classified as nonpreferred.

With reference to the Figures, a computer 102 of a vehicle 100 includes a processor and a memory storing instructions executable by the processor to receive a series of pressure maps 104 indicating a respective series of sitting positions of an occupant in a seat 106, wherein the pressure maps 104 include a current pressure map 104; update a profile of the occupant based on the pressure maps 104, wherein the profile includes a plurality of clusters of sitting positions and classifications of the clusters as preferred or nonpreferred, and updating the profile includes sorting one of the sitting positions into one of the clusters that is classified as preferred in response to the occupant remaining in that sitting position for greater than a threshold time; and adjust a physical configuration of the seat 106 in response to the current sitting position being in one of the clusters that is classified as nonpreferred.

The computer 102 can configure the seat 106 in a way that the occupant finds most comfortable, and in a way that encourages the occupant to use a sitting position that the occupant finds comfortable. The profile can keep track of multiple sitting positions that the occupant finds comfortable, and the profile can update over time as the preferences of the occupant change.

With reference to FIG. 1, the vehicle 100 may be any suitable type of automobile, e.g., a passenger or commercial automobile such as a sedan, a coupe, a truck, a sport utility, a crossover, a van, a minivan, a taxi, a bus, etc. The vehicle 100, for example, may be autonomous. In other words, the vehicle 100 may be autonomously operated such that the vehicle 100 may be driven without constant attention from a driver, i.e., the vehicle 100 may be self-driving without human input.

The vehicle 100 includes a passenger cabin 108 to house occupants, if any, of the vehicle 100. The passenger cabin 108 includes one or more front seats 106 disposed at a front of the passenger cabin 108 and one or more back seats 106 disposed behind the front seats. The passenger cabin 108 may also include third-row seats 106 (not shown) at a rear of the passenger cabin 108. In FIG. 1, the front seats 106 are shown to be bucket seats and the back seats 106 are shown to be bench seats, but the seats 106 may be other types.

Figure 2:
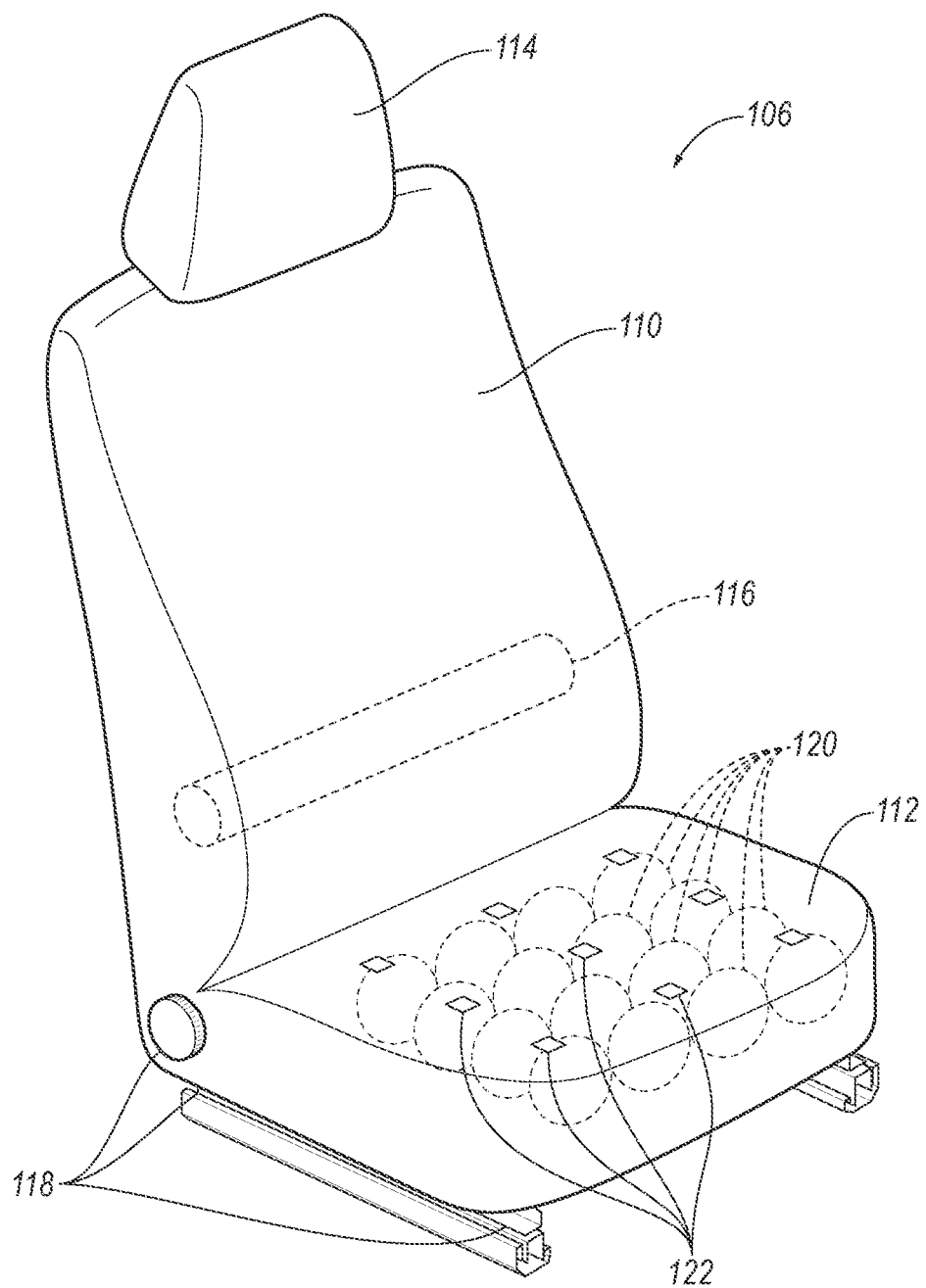
FIG. 2 is a perspective view of a seat of the vehicle.

With reference to FIG. 2, the seat 106 occupied by the occupant can include a seat back 110, a seat bottom 112, and a head restraint 114. The head restraint 114 may be supported by the seat back 110 and may be stationary or movable relative to the seat back 110. The seat back 110 may be supported by the seat bottom 112 and may be stationary or movable relative to the seat bottom 112. The seat back 110, the seat bottom 112, and/or the head restraint 114 may be adjustable in multiple degrees of freedom. Specifically, the seat back 110, the seat bottom 112, and/or the head restraint 114 may themselves be adjustable, in other words, adjustable components within the seat back 110, the seat bottom 112, and/or the head restraint 114, and/or may be adjustable relative to each other.

The seat 106 has a physical configuration that is adjustable. The physical configuration is a combination of positions or settings of the adjustable components, e.g., the seat back 110, the head restraint 114, the seat bottom 112, armrests, etc., of the seat 106. The physical configuration includes at least one of a tilt of the seat 106, a height of the seat 106, a recline angle of the seat 106, or a lumbar support position of the seat 106. The tilt of the seat 106 is an angle of the seat bottom 112 relative to the passenger cabin 108 about a lateral axis, i.e., a pitch of the seat bottom 112. The height of the seat 106 is a vertical distance of a reference point on the seat bottom 112 relative to the passenger cabin 108. The recline angle of the seat 106 is an angle of the seat back 110 relative to the seat bottom 112. The lumbar support position is a vehicle-forward position of a lumbar support bar 116, located in the seat back 110, relative to the seat back 110. Additionally or alternatively, the seat 106 may be adjustable in other degrees of freedom.

The seat 106 includes a plurality of seat actuators 118 that adjust the positions or settings of the components of the seat 106. For example, the seat actuators 118 can include a rotary actuator to recline the seat back 110 relative to the seat bottom 112, linear actuators underneath a front and rear of the seat bottom 112 to lift or lower the front or rear of the seat bottom 112 to adjust the height and tilt of the seat 106, and a linear actuator in the seat back 110 to adjust the position of the lumbar support bar 116.

The seat bottom 112 and possibly the seat back 110 can include a plurality of bladders 120. The bladders 120 are flexible bags fillable with fluid (liquid or gas). The bladders 120 can be arranged in a plane generally parallel to the seat bottom 112, e.g., in horizontally arranged rows. The bladders 120 each have a fill level, which is a quantity of fluid in the respective bladder 120. The bladders 120 can be supplied by a compressor or pump and valves (not shown) for the respective bladders 120. The physical configuration can include the fill levels of the respective bladders 120.

The seat 106 includes a plurality of pressure sensors 122 arranged across the seat bottom 112. The pressure sensors 122 can be any suitable type for measuring a pressure exerted by the occupant at the respective points at which the pressure sensors 122 are located, e.g., strain gauge, piezoelectric, etc. The pressure sensor 122 can be arranged in, e.g., a grid pattern.

Figure 3:
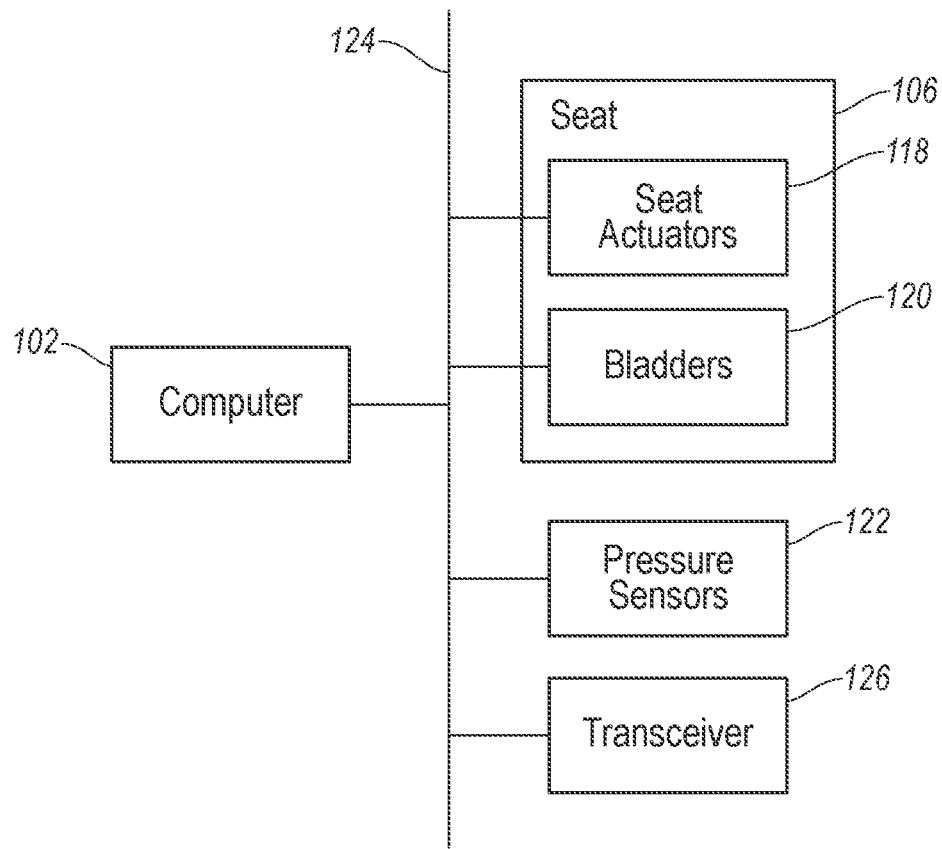
FIG. 3 is a block diagram of a system for the seat.

With reference to FIG. 3, the computer 102 is a microprocessor-based computing device, e.g., a generic computing device including a processor and a memory, an electronic controller or the like, a field-programmable gate array (FPGA), an application-specific integrated circuit (ASIC), etc. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 can transmit and receive data through a communications network 124 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the seat 106 (i.e., the seat actuators 118 and/or the bladders 120), the pressure sensors 122, a transceiver 126, and other components via the communications network 124.

The transceiver 126 may be adapted to transmit signals wirelessly through any suitable wireless communication protocol, such as Bluetooth®, WiFi, IEEE 802.11a/b/g, other RF (radio frequency) communications, etc. The transceiver 126 may be adapted to communicate with a remote server, that is, a server distinct and spaced from the vehicle 100. The remote server may be located outside the vehicle 100. For example, the remote server may be associated with another vehicle 100 (e.g., V2V communications), an infrastructure component (e.g., V2I communications via Dedicated Short-Range Communications (DSRC) or the like), an emergency responder, a mobile device associated with the owner of the vehicle 100, etc. The transceiver 126 may be one device or may include a separate transmitter and receiver.

Figure 4:
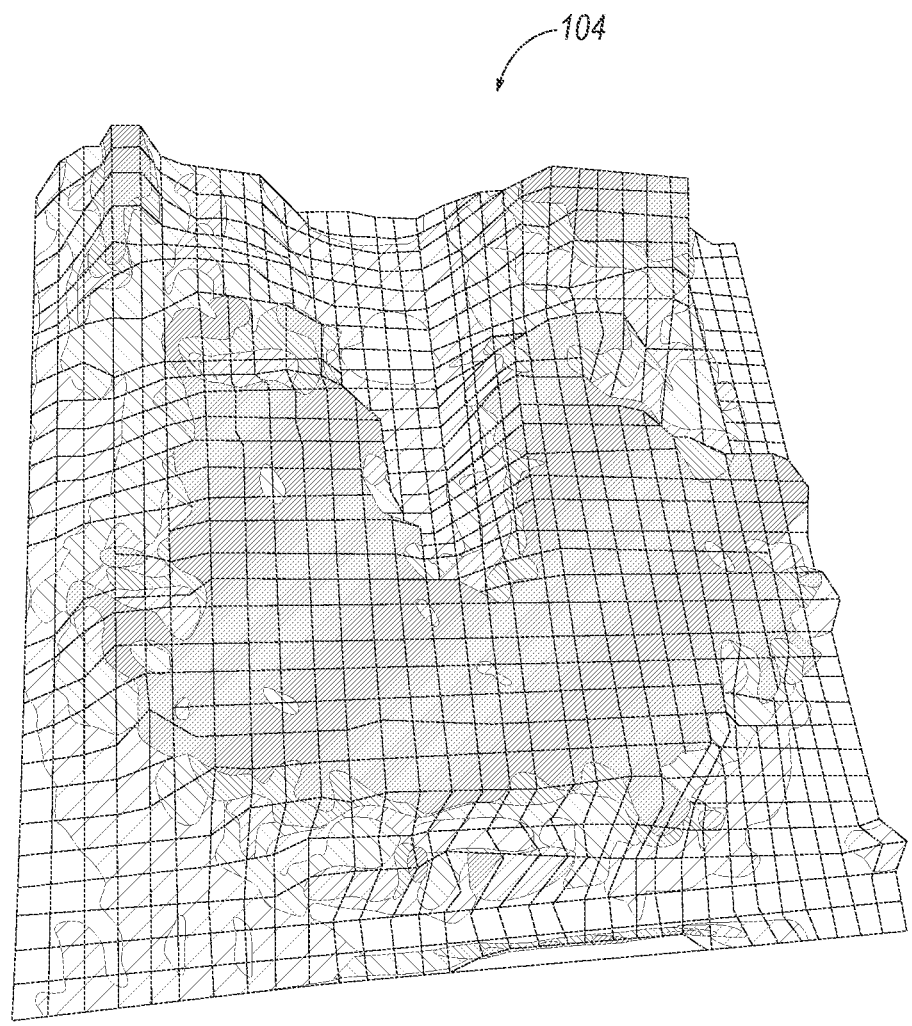
FIG. 4 is a pressure map representing a sitting position of an occupant in the seat.

With reference to FIG. 4, the data from the pressure sensors 122 collectively generate the pressure map 104. For the purposes of this disclosure, a "pressure map" is a set of positions and values for pressures measured those positions at the same time. Each value of pressure in the pressure map 104 can be detected by one of the pressure sensors 122. For example, positions of the pressure sensors 122 on the seat bottom 112 can be represented by two-dimensional coordinates (x, y), with x representing a longitudinal position, i.e., along a vehicle-forward axis, and y representing a lateral position, i.e., along a vehicle-leftward axis. The pressure map 104 includes a value for a pressure at each position. The values for pressure are in units of force per area, e.g., MPa. FIG. 4 depicts the positions (x, y) along two horizontal axes and the values for pressure represented by vertical height and shading. The pressure map 104 can be organized in different ways. For example, if the pressure sensors 122 are arranged in an n×m grid, the pressure map 104 can be organized as a vector in which each entry in the vector is the value for pressure at one of the positions, e.g., $<p_1, p_2, \ldots p_n, p_{n+1}, \ldots p_{n*m}>$, in which $p_1$ is the value for pressure at $(x_1, y_1)$, $p_2$ at $(x_2, y_1)$, $p_n$ at $(x_n, y_1)$, $p_{n+1}$ at $(x_1, y_2)$, $p_{n*m}$ at $(x_n, y_m)$. Organizing the pressure map 104 as a vector can make processing faster when using the pressure maps 104.

The pressure maps 104 indicate the sitting positions. The sitting positions are arrangements of the body of the occupant; for example, the occupant can have their weight centered or shifted more toward one side, can be leaning back or forward, can have their thighs raised or lowered, etc. Respective sitting positions can be defined by correspondingly different pressure maps 104. For example, in the pressure map 104 in FIG. 4, the occupant has their weight centered laterally and shifted more toward the rear, with their left thigh lifted compared to their right thigh.

The memory of the computer 102 can store a profile for each of a plurality of potential occupants. Each profile can include a plurality of clusters of the sitting positions, classifications of the clusters as preferred or nonpreferred, and a matrix of probabilities of transition from respective clusters into respective other clusters, as each described in more detail below.

The clusters are groupings of similar sitting positions of the occupant. Similar sitting positions are sitting positions that are sufficiently close to each other that on average occupants perceive that they are the effectively the same. Similar sitting positions can be determined by empirical testing with a plurality of test occupants, for example. As described below, the sitting positions are organized into the clusters by machine learning, e.g., unsupervised learning. Different measures of similarity can be used for the machine learning, as described below, e.g., Kullback-Leibler divergence, cosine similarity, etc. Each cluster includes sitting positions that feel similar to the occupant. The clusters can be represented by their centroids (as described below) or by prototypes, i.e., data points (in this case the pressure maps 104) that represent respective clusters. Each cluster is classified as preferred or nonpreferred, i.e., whether the occupant prefers to sit in the sitting positions in the cluster or not.

The profile can include the matrix T of probabilities of transition from respective clusters into respective other clusters.

$$T = \begin{bmatrix} 0 & p_{21} & \cdots & p_{N1} \\ p_{12} & 0 & & p_{N2} \\ \vdots & & \ddots & \vdots \\ p_{1N} & p_{2N} & \cdots & 0 \end{bmatrix}$$

The matrix is an N×N matrix, in which N is the number of clusters in the profile. The columns can represent a current cluster that the occupant is sitting in, and the rows can represent a next cluster that the occupant will sit in (or vice versa); i.e., the value $p_{ij}$ in the ith column and jth row is a probability of transitioning next to the jth cluster, given that the occupant is currently in the ith cluster. The probability $p_{ii}$ of transitioning from a cluster into the same cluster is defined to be zero. Each column sums to 1. As described below, the matrix T is based on the series of pressure maps 104 from the occupant's sitting positions.

Figure 5:
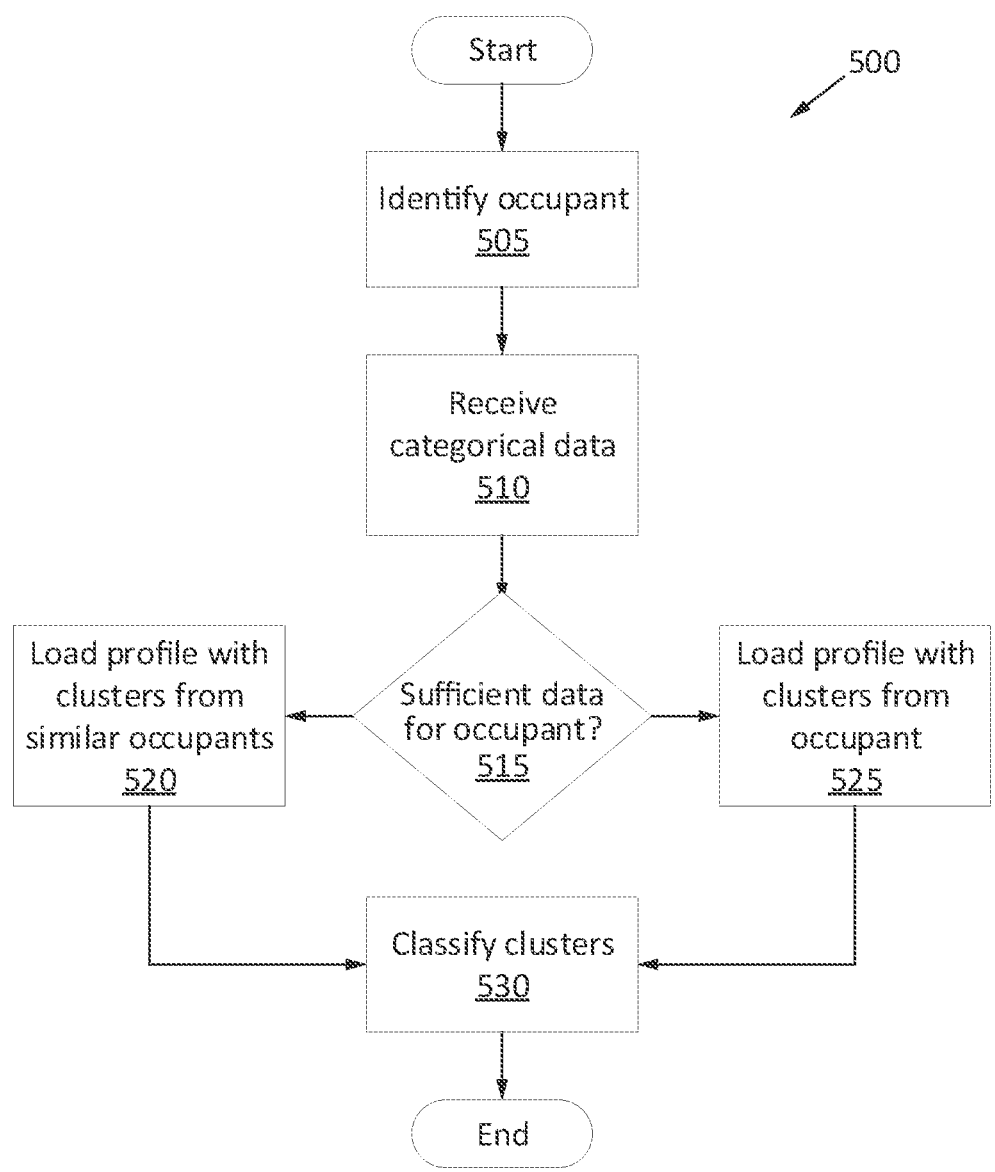
FIG. 5 is a process flow diagram of an example process for initializing a profile of the sitting positions for the occupant.

FIG. 5 is a process flow diagram illustrating an exemplary process 500 for initializing the profile of the sitting positions of the occupant. The memory of the computer 102 stores executable instructions for performing the steps of the process 500 and/or programming can be implemented in structures such as mentioned above. As a general overview of the process 500, the computer 102 identifies the occupant, receives categorical data about the occupant such as vehicle type and demographic information, loads the profile either with clusters of the occupant's sitting positions or sitting positions of similar occupants depending on whether sufficient data has been gathered about the sitting positions of the occupant, and classifies the clusters in the profile as preferred or nonpreferred.

The process 500 begins in a block 505, in which the computer 102 identifies the occupant. For example, the occupant can use a keyfob to start the vehicle 100, and the keyfob has an RFID tag or the like uniquely specifying the occupant from among other potential occupants who regularly use the vehicle 100. The RFID signal can be associated with the occupant in memory. For another example, a mobile phone or device of the occupant can pair with, e.g., a user interface of the vehicle 100. The mobile phone or device can be associated with the occupant in memory. For another example, the computer 102 can receive data from an internal camera having a field of view including a face of the occupant and can identify the occupant using image-recognition techniques as are known. For another example, the occupant can enter identifying information such as a username and password into a user interface.

Next, in a block 510, the computer 102 determines a plurality of features of the occupant. The features are facts specific to the occupant. For example, the features can include demographic information about the occupant, e.g., height, weight, age, gender, state of residence, etc. The demographic information can be stored in memory and associated with the profile of the occupant. For another example, the features can include a vehicle type of the vehicle 100 in which the occupant is sitting. The computer 102 can store the type of the vehicle 100 in which it is installed in memory.

Next, in a decision block 515, the computer 102 determines whether sufficient data about the sitting positions of the occupant have been collected for the profile to be based on only the occupant's data. For example, the computer 102 can determine whether a collection distance, i.e., a number of miles that the vehicle 100 has traveled while recording the sitting positions of the occupant, has increased above a distance threshold. The distance threshold can be chosen to be sufficiently long that the computer 102 is no longer collecting new sitting positions. For another example, the computer 102 can determine whether a collection time, i.e., a collective duration during which the vehicle 100 has traveled while recording the sitting positions of the occupant, has increased above a time threshold. The time threshold can be chosen to sufficiently long that the computer 102 is no longer collecting new sitting positions. If sufficient data has been gathered, the process 500 proceeds to a block 520. If insufficient data has been gathered, the process 500 proceeds to a block 525.

In the block 520, the computer 102 loads a profile for the occupant having clusters of the sitting positions of the occupant and the sitting positions of a plurality of other occupants. The clusters can be based on the sitting positions of only other occupants having the same features as the occupant, e.g., a same vehicle type and same demographic information. The sitting positions in the profile can be sorted into clusters using unsupervised learning, e.g., known algorithms such as k-means, hierarchical aggregation, self-organizing feature maps, etc. The computer 102 can pull clusters of occupants having the same features as the occupant from a remote server using the transceiver 126. Using sitting positions from other occupants having the same features provides a good estimate of what the preferences of the occupant are likely to be in the situation in which there is insufficient data about the occupant. After the block 520, the process 500 proceeds to a block 530.

In the block 525, the computer 102 loads a profile for the occupant having clusters based wholly on the sitting positions of the occupant, i.e., not on any other occupants. The sitting positions in the profile can be sorted into clusters using unsupervised learning, e.g., known algorithms such as k-means, hierarchical aggregation, self-organizing feature maps, etc. After the block 525, the process 500 proceeds to a block 530.

In the block 530, the computer 102 classifies each cluster in the loaded profile as preferred or nonpreferred. The computer 102 can use a machine-learning algorithm for classifying items into a known number of categories, e.g., naive Bayesian, nearest neighbor, polynomial classifiers, artificial neural networks, etc. Inputs to the machine-learning algorithm can include a duration of remaining in the sitting positions in the same cluster, a variation among the sitting positions of each cluster, a return time from switching out of any of the sitting positions in each cluster to switching back to one of the sitting positions in the same cluster, etc. A greater duration of remaining in the sitting positions in a cluster increases a likelihood of the classification being preferred. A higher variation among the sitting positions of a cluster increases a likelihood of the classification being nonpreferred. A greater return time from switching out of any of the sitting positions in a cluster to switching back to one of the sitting positions in the same cluster increases a likelihood of the classification being nonpreferred. In other words, remaining in a sitting position longer and switching back to that sitting position more quickly and/or more frequently indicates that the occupant prefers that sitting position, and transitioning out of a sitting position more quickly and fidgeting more in that sitting position indicates that the occupant does not prefer that sitting position. Other inputs may also be used. Training data for the machine-learning algorithm can be generated by, e.g., experiments surveying occupants about comfort while shifting between different sitting positions. For example, the training data can be generated by recording a series of the pressure maps 104 of occupants and prompting the occupants to answer whether the sitting position is comfortable or uncomfortable while the occupants drive a vehicle. If the responding occupant states that a sitting position is comfortable, the sitting position is classified as preferred in the training data, and if the responding occupant states that a sitting position is uncomfortable, the sitting position is classified as nonpreferred in the training data, e.g., the classification can be a binary choice of 1 for preferred and 0 for nonpreferred. Alternatively, each sitting position can have a score for preferred and a score for nonpreferred, and the sitting position is classified according to which of the two scores is greater. After the block 530, the process 500 ends.

Figure 6:
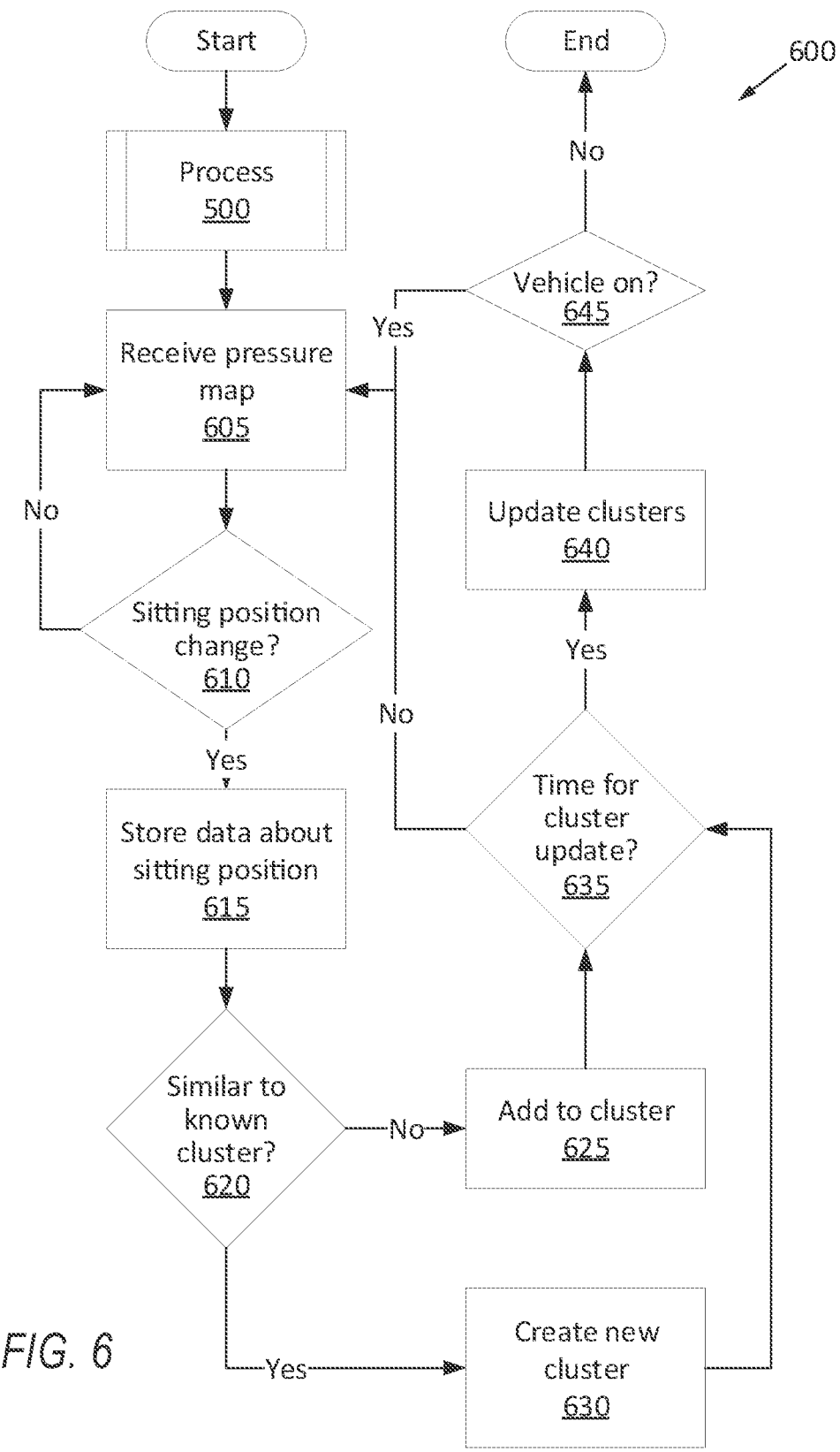
FIG. 6 is a process flow diagram of an example process for updating the profile.

FIG. 6 is a process flow diagram illustrating an exemplary process 600 for updating the profile of the occupant. The memory of the computer 102 stores executable instructions for performing the steps of the process 600 and/or programming can be implemented in structures such as mentioned above. The process 600 can begin, e.g., when the vehicle 100 starts and continue for as long as the vehicle 100 is on. As a general overview of the process 600, the computer 102 loads the profile and receives a series of the pressure maps 104. Each time the sitting position of the occupant changes, the computer 102 stores data about the sitting position and, depending on whether a similarity measure between the sitting position and the closest cluster is greater than a threshold, adds the sitting position to the closest cluster or creates a new cluster. Periodically, the computer 102 updates the clusters by merging or splitting.

The process 600 begins by performing the process 500 described above to load the profile for the occupant.

Next, in a block 605, the computer 102 receives a current pressure map 104 from the pressure sensors 122.

Next, in a decision block 610, the computer 102 determines whether the sitting position of the occupant has changed. The computer 102 can determine whether the current pressure map 104 indicates a different sitting position than the next most recent pressure map 104. For example, the computer 102 can determine whether any of the values for pressure in the pressure map 104 have changed by more than a pressure threshold. The pressure threshold can be chosen based on, e.g., a known level of noise of the pressure sensor 122, e.g., determined from empirical testing, specified by a sensor manufacturer, etc. If the sitting position has not changed, the process 600 returns to the block 605 to receive the next current pressure map 104. As the process 600 cycles between the blocks 605 and 610, the computer 102 receives the series of pressure maps 104. If the sitting position has changed, the process 600 proceeds to a block 615.

In the block 615, the computer 102 updates the profile to includes the immediately previous sitting position, i.e., the sitting position that the occupant just transitioned away from. The computer 102 also stores data related to that sitting position including the duration that the occupant remained in that sitting position, and the current sitting position that the occupant just transitioned into. This data will be used when sorting the immediately previous sitting position into one of the clusters and updating the matrix T in a block 625 below.

Next, in a decision block 620, the computer 102 determines whether the immediately previous sitting position is sufficiently similar to any of the clusters in the profile. The computer 102 can calculate similarity measures between the current pressure map 104 and each cluster in the profile. If the highest similarity measure is above a threshold similarity, then the immediately previous sitting position is sufficiently similar to the corresponding cluster; otherwise, the immediately previous sitting position is not sufficiently similar to any of the clusters. The similarity threshold can be chosen, e.g., experimentally by surveying occupants about comfort while shifting between different sitting positions, e.g., as described above with respect to the block 530, and identifying a value of a similarity measure at which opinions on comfort change, e.g., a value of a similarity measure resulting in clusters in the training data having sitting positions that are nearly uniformly classified by the responding occupants as comfortable or as uncomfortable, i.e., the clusters are nearly uniformly preferred or nonpreferred, e.g., at least a threshold proportion of each cluster is preferred or is nonpreferred. The threshold proportion can be chosen to be close to uniform while accounting for outliers, e.g., 95%. One example of a similarity measure is Kullback-Liebler divergence:

$$D_{KL}(P\|Q) = \sum_{x \in X} P(x) \log\left(\frac{P(x)}{Q(x)}\right)$$

in which x is a variable representing the positions of the pressure map 104, P is the pressure map 104 represented as a probability distribution of values of pressure over x, and Q is the centroid of the cluster of interest represented as a probability distribution. The centroid of a cluster is a pressure map 104 in which the value of pressure at each location is the average of the pressures at that location over the pressure maps 104 in that cluster. Another example of a similarity measure is cosine similarity, which is an inner product between the pressure map 104 and the centroid of the cluster of interest, both represented as vectors:

$$\text{similarity} = \frac{A \cdot B}{\|A\|\|B\|}$$

in which A is the pressure map 104 represented as a vector, and B is the centroid of the cluster of interest. Other similarity measures could instead be used, e.g., Euclidean distance to the centroid, Mahalanobis distance to the centroid, etc. In response to at least one of the similarity measures between the immediately previous sitting position and each of the clusters being above the threshold similarity, the process 600 proceeds to a block 625. In response to none of the similarity measures between the immediately previous sitting position and each of the clusters being above the threshold similarity, the process 600 proceeds to a block 630.

In the block 625, the computer 102 sorts the immediately previous sitting position into one of the clusters based on the similarity measures between that sitting position and each of the clusters, specifically, into the cluster with which that sitting position has highest similarity measure. If the occupant remained in that sitting position for greater than a threshold time, the computer 102 sorts that sitting position into the cluster classified as preferred that has the highest similarity measure. The probabilities in the matrix T are also updated. After the block 625, the process 600 proceeds to a decision block 635.

In the block 630, the computer 102 creates a new cluster and sorts the immediately previous sitting position into the new cluster. The cluster can be classified as preferred if the occupant remained in that sitting position for at least the threshold time and as nonpreferred otherwise. After the block 630, the process 600 proceeds to the decision block 635.

In the decision block 635, the computer 102 determines whether the profile is due for updating. For example, the computer 102 can determine whether a threshold updating time has elapsed since the last update, i.e., since the last time that the computer 102 executed a block 640. The threshold updating time can be chosen to be sufficiently long that an overlap between two clusters is likely to have arisen. If the profile is not due for updating, the process 600 returns to the block 605 to continue receiving the series of pressure maps 104. If the profile is due for updating, the process 600 proceeds to a block 640.

In the block 640, the computer 102 combines any pairs of clusters that overlap with each other into a single cluster. Combining two clusters into a single cluster only occurs if the two clusters are both classified as preferred or both classified as nonpreferred. The matrix T is updated accordingly.

Next, in a decision block 645, the computer 102 determines whether the vehicle 100 is still on. If the vehicle 100 is still on, the process 600 returns to the block 605 to continue receiving the series of pressure maps 104. If the vehicle 100 has been turned off, the process 600 ends.

Figure 7:
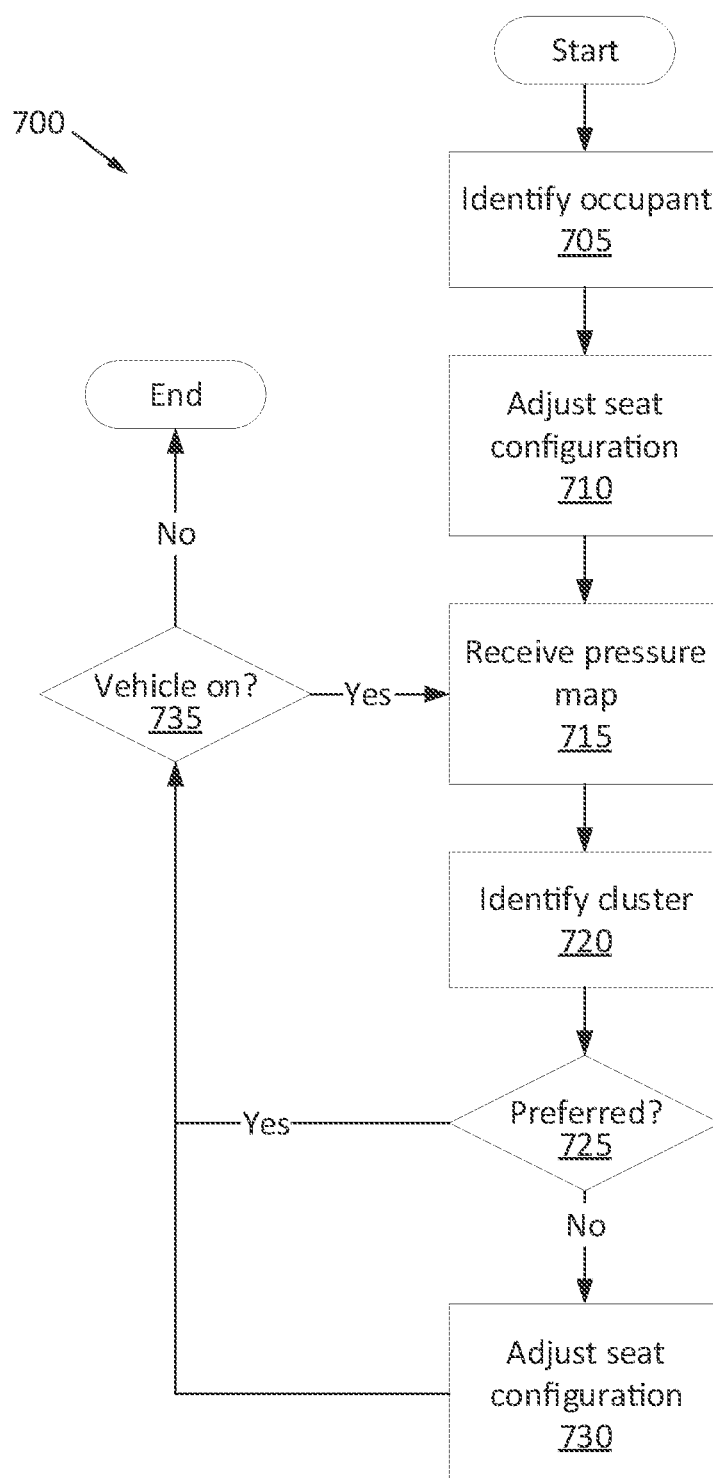
FIG. 7 is a process flow diagram of an example process for adjusting a physical configuration of the seat.

FIG. 7 is a process flow diagram illustrating an exemplary process 700 for adjusting the physical configuration of the seat 106. The memory of the computer 102 stores executable instructions for performing the steps of the process 700 and/or programming can be implemented in structures such as mentioned above. The process 700 can run concurrently with the process 600 and can continue running for as long as the vehicle 100 is on. As a general overview of the process 700, the computer 102 identifies the occupant, receives the current pressure map 104, identifies the cluster to which the pressure map 104 belongs, and, if that cluster is nonpreferred, adjusts the seat 106 configuration to encourage the occupant into a different sitting position.

The process 700 begins in a block 705, in which the computer 102 identifies the occupant, as described above with respect to the block 505 of the process 500.

Next, in a block 710, the computer 102 instructs the seat actuators 118 and/or the bladders 120 to adjust the physical configuration of the seat 106, e.g., to adjust at least one of the tilt of the seat 106, the height of the seat 106, the recline angle of the seat 106, or the lumbar support position of the seat 106, and/or to adjust one or more of the fill levels of the bladders 120. Adjusting the physical configuration of the seat 106, i.e., selecting which and how much to actuate the seat actuators 118 and/or bladders 120, is based on a most likely cluster for the occupant, according to the matrix T. For example, the computer 102 can calculate or approximate a stationary matrix $T_s$ representing the probabilities of being in each cluster after an arbitrarily long period of time:

$$T_s = \lim_{k \to \infty} T^k = \begin{bmatrix} p_1 & p_2 & \cdots & p_N \\ p_1 & p_2 & \cdots & p_N \\ \vdots & \vdots & & \vdots \end{bmatrix}$$

in which $p_i$ is the probability of being in the ith cluster after an arbitrarily long period of time. The entries in a column all converge to the same value $p_i$. The stationary matrix $T_s$ can be approximated by raising the matrix T to a large power, e.g., $T^{10}$. The computer 102 can adjust the physical configuration in a way that encourages the occupant to sit in the most-likely cluster, i.e., the cluster of the largest value of $p_i$ in the stationary matrix $T_s$. The computer 102 can use the output of a machine-learning algorithm that classifies the possible physical configurations of the seat 106 according to which cluster they are most likely to encourage the occupant to transition to, e.g., naive Bayesian, nearest neighbor, polynomial classifiers, artificial neural networks, etc. Training data for the machine-learning algorithm can be generated by, e.g., experiments in which the seat 106 is changed to different physical configurations while recording the pressure maps 104 showing how the sitting positions of the occupants change. The training data thus includes physical configurations of the seat 106 and corresponding current and subsequent sitting positions, from which the machine-learning algorithm can learn which physical configuration can produce the subsequent sitting position. When executing the machine-learning algorithm, the subsequent sitting position is selected as the most likely cluster from the stationary matrix $T_s$.

Next, in a block 715, the computer 102 receives the current pressure map 104 from the pressure sensors.

Next, in a block 720, the computer 102 identifies the cluster to which the current pressure map 104 belongs. The computer 102 can determine to which cluster the current pressure map 104 has the highest similarity measure, using the same similarity measure as used in the decision block 620 above.

Next, in a decision block 725, the computer 102 determines whether the cluster identified in the block 720 is classified as preferred or nonpreferred. If the current sitting position is in one of the clusters that is classified as nonpreferred, the process 700 proceeds to a block 730. If the current sitting position is in one of the clusters that is classified as preferred, the process 700 proceeds to a decision block 735.

In the block 730, the computer 102 instructs the seat actuators 118 and/or the bladders 120 to adjust the physical configuration of the seat 106, e.g., to adjust at least one of the tilt of the seat 106, the height of the seat 106, the recline angle of the seat 106, or the lumbar support position of the seat 106, and/or to adjust one or more of the fill levels of the bladders 120. Adjusting the physical configuration of the seat 106, i.e., selecting which and how much to actuate the seat actuators 118 and/or bladders 120, is based on the cluster into which the identified cluster is most likely to transition, according to the matrix T. The computer 102 can adjust the physical configuration in a way that encourages the occupant to transition from the identified cluster to the most-likely-transition cluster. The computer 102 can use the output of a machine-learning algorithm that classifies the possible physical configurations of the seat 106 according to which cluster they are most likely to encourage the occupant to transition to, e.g., naive Bayesian, nearest neighbor, polynomial classifiers, artificial neural networks, etc. Training data for the machine-learning algorithm can be generated by, e.g., experiments in which the seat 106 is changed to different physical configurations while recording the pressure maps 104 showing how the sitting positions of the occupants change. The training data thus includes physical configurations of the seat 106 and corresponding current and subsequent sitting positions, from which the machine-learning algorithm can learn which physical configuration can produce the subsequent sitting position given the current sitting position. When executing the machine-learning algorithm, the subsequent sitting position is selected from the matrix T based on the current sitting position. Alternatively, the most-likely-transition cluster can be used as described above only if that cluster is classified as preferred. If the most-likely transition cluster is classified as nonpreferred, the same procedure can be used but with the most-likely cluster, i.e., the cluster of the largest value of $p_i$ in the stationary matrix $T_s$, instead of the most-likely-transition cluster. After the block 730, the process 700 proceeds to the decision block 735.

In the decision block 735, the computer 102 determines whether the vehicle 100 is still on. If the vehicle 100 is still on, the process 700 returns to the block 715 to continue receiving the series of pressure maps 104. If the vehicle 100 has been turned off, the process 700 ends.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, nonvolatile media, volatile media, etc. Nonvolatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. Many modifications and variations of the present disclosure are possible in light of the above teachings, and the disclosure may be practiced otherwise than as specifically described.

The invention claimed is:

1. A computer comprising a processor and a memory storing instructions executable by the processor to:

receive a series of pressure maps indicating a respective series of sitting positions of an occupant in a seat, wherein the pressure maps include a current pressure map;

update a profile of the occupant based on the pressure maps, wherein the profile includes a plurality of clusters of sitting positions and classifications of the clusters as preferred or nonpreferred, and updating the profile includes sorting one of the sitting positions into one of the clusters that is classified as preferred in response to the occupant remaining in that sitting position for greater than a threshold time; and adjust a physical configuration of the seat in response to the current sitting position being in one of the clusters that is classified as nonpreferred.

2. The computer of claim 1, wherein adjusting the physical configuration of the seat is based on the one of the clusters into which the cluster including the current sitting position is most likely to transition.

3. The computer of claim 2, wherein the profile includes a matrix of probabilities of transition from respective clusters into respective other clusters, and the matrix is based on the series of pressure maps.

4. The computer of claim 1, wherein the instructions include instructions to sort each of the series of sitting positions into one of the clusters based on similarity measures between that sitting position and each of the clusters.

5. The computer of claim 4, wherein the instructions include instructions to, in response to none of the similarity measures between one of the sitting positions and each of the clusters being above a threshold similarity, create a new cluster and sort that sitting position into the new cluster.

6. The computer of claim 1, wherein the clusters are based on the sitting positions of a plurality of other occupants.

7. The computer of claim 6, wherein the instructions include instructions to determine a plurality of features of the occupant, and the clusters are based only on the sitting positions of the occupant and other occupants having the same features as the occupant.

8. The computer of claim 7, wherein the features include a vehicle type in which the respective occupants were sitting in the sitting positions.

9. The computer of claim 7, wherein the features include demographic information about the occupants.

10. The computer of claim 6, wherein the clusters are based at least in part on the sitting positions of the other occupants until a collection distance or collection time of the series of pressure maps of the occupant increases above a respective distance threshold or time threshold, after which the clusters are based wholly on the series of sitting positions of the occupant.

11. The computer of claim 1, wherein the instructions include instructions to classify each cluster as preferred or nonpreferred based on a duration of remaining in the sitting positions in that cluster, and greater duration increases a likelihood of the classification being preferred.

12. The computer of claim 1, wherein the instructions include instructions to classify each cluster as preferred or nonpreferred based on a variation among the sitting positions of that cluster, and higher variation increases a likelihood of the classification being nonpreferred.

13. The computer of claim 1, wherein the instructions include instructions to classify each cluster as preferred or nonpreferred based on a return time from switching out of any of the sitting positions in that cluster to switching back to one of the sitting positions in that cluster, and a greater return time increases a likelihood of the classification being nonpreferred.

14. The computer of claim 1, wherein the instructions include instructions to combine two clusters into a single cluster based on overlap between the two clusters.

15. The computer of claim 14, wherein combining two clusters only occurs if the two clusters are both classified as preferred or both classified as nonpreferred.

16. The computer of claim 1, wherein the instructions include instructions to identify the occupant, and load the profile of the occupant based on the identification of the occupant.

17. A system comprising:
a seat having a physical configuration that is adjustable; and
a computer communicatively coupled to the seat;
wherein the computer is programmed to:
receive a series of pressure maps indicating a respective series of sitting positions of an occupant in the seat, wherein the pressure maps include a current pressure map;
update a profile of the occupant based on the pressure maps, wherein the profile includes a plurality of clusters of sitting positions and classifications of the clusters as preferred or nonpreferred, and updating the profile includes sorting one of the sitting positions into one of the clusters that is classified as preferred in response to the occupant remaining in that sitting position for greater than a threshold time; and
adjust the physical configuration of the seat in response to the current sitting position being in one of the clusters that is classified as nonpreferred.

18. The system of claim 17, wherein the physical configuration includes at least one of a tilt of the seat, a height of the seat, a recline angle of the seat, or a lumbar support position of the seat.

19. The system of claim 17, wherein the seat includes a seat bottom including a plurality of bladders, and the physical configuration includes fill levels of the respective bladders.

20. A method comprising:
receiving a series of pressure maps indicating a respective series of sitting positions of an occupant in a seat, wherein the pressure maps include a current pressure map;
updating a profile of the occupant based on the pressure maps, wherein the profile includes a plurality of clusters of sitting positions and classifications of the clusters as preferred or nonpreferred, and updating the profile includes sorting one of the sitting positions into one of the clusters that is classified as preferred in response to the occupant remaining in that sitting position for greater than a threshold time; and
adjusting a physical configuration of the seat in response to the current sitting position being in one of the clusters that is classified as nonpreferred.

* * * * *